United States Patent
Mehra et al.

(10) Patent No.: US 7,610,613 B2
(45) Date of Patent: Oct. 27, 2009

(54) SERVLET AUTHENTICATION FILTERS

(75) Inventors: Vinod Mehra, Alameda, CA (US); Neil Smithline, Newton, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 818 days.

(21) Appl. No.: 11/123,389

(22) Filed: May 6, 2005

(65) Prior Publication Data

US 2005/0268108 A1    Dec. 1, 2005

Related U.S. Application Data

(60) Provisional application No. 60/568,626, filed on May 6, 2004.

(51) Int. Cl.
*G06F 7/04* (2006.01)
(52) U.S. Cl. .......................................... 726/3; 713/168
(58) Field of Classification Search ...................... 726/3; 713/182, 168
See application file for complete search history.

(56) References Cited

U.S. PATENT DOCUMENTS

| | | | |
|---|---|---|---|
| 6,965,939 B2 * | 11/2005 | Cuomo et al. ................ | 709/229 |
| 7,130,877 B2 * | 10/2006 | McNeely et al. ............. | 709/201 |
| 2003/0145048 A1 * | 7/2003 | Susarla et al. ................ | 709/203 |
| 2005/0102324 A1 * | 5/2005 | Spring et al. .............. | 707/104.1 |
| 2005/0198285 A1 * | 9/2005 | Petit ........................... | 709/225 |
| 2008/0183760 A1 * | 7/2008 | Spring et al. .............. | 707/104.1 |

* cited by examiner

*Primary Examiner*—Jung Kim
*Assistant Examiner*—Samson B Lemma
(74) *Attorney, Agent, or Firm*—Fliesler Meyer LLP

(57) ABSTRACT

In accordance with embodiments, one or more authentication filters may be employed to supplement an authentication process. The authentication process to be supplemented may be executed by one or more servlets in a servlet container. A servlet authentication filter is an authentication filter that may be invoked by a servlet. Requests may be made by requestors (also called "users"), which include humans as well as computational entities. The ability to modify a request and/or request state can enable multi-phase authentication processes, i.e., authentication processes with more than one authentication step, or modification to a default authentication process, i.e., authentication processes invoked if no other authentication processes are provided.

27 Claims, 4 Drawing Sheets

SERVLET AUTHENTICATION FILTERS

PRIORITY CLAIM

The present application claims priority to the following provisional application, the contents of which are incorporated by reference herein in their entirety:

U.S. Provisional Patent Application No. 60/568,626, entitled SERVLET AUTHENTICATION FILTERS by Vinod Mehra et al., filed May 6, 2004.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems, methods, and computer readable media for providing secure authentication on a web server. The present invention relates more specifically to enable servlets to utilize supplemental authentication mechanisms.

BACKGROUND

As the transactions and data access performed through the Internet have become both more sensitive and mission critical, there has been a need to implement better and more reliable security mechanisms for access to protected resources. A certain number of third party authentication providers have arisen to respond to this need.

However, these providers cannot be easily utilized by web applications. For example, some implementations have allowed different servers to employ custom "plug in" mechanisms for authentication. Due to the organization of web applications, however, allowing an authentication module to enter into an interactive conversation with a client (or other servers) using such a mechanism can be problematical. The use of such approaches restricts authentication mechanisms to only those mechanisms that can interact with the authentication types offered by a server container.

What is needed is a mechanism for utilizing supplemental authentication mechanisms for servlets and other web applications.

DETAILED DESCRIPTION

Figure 1:
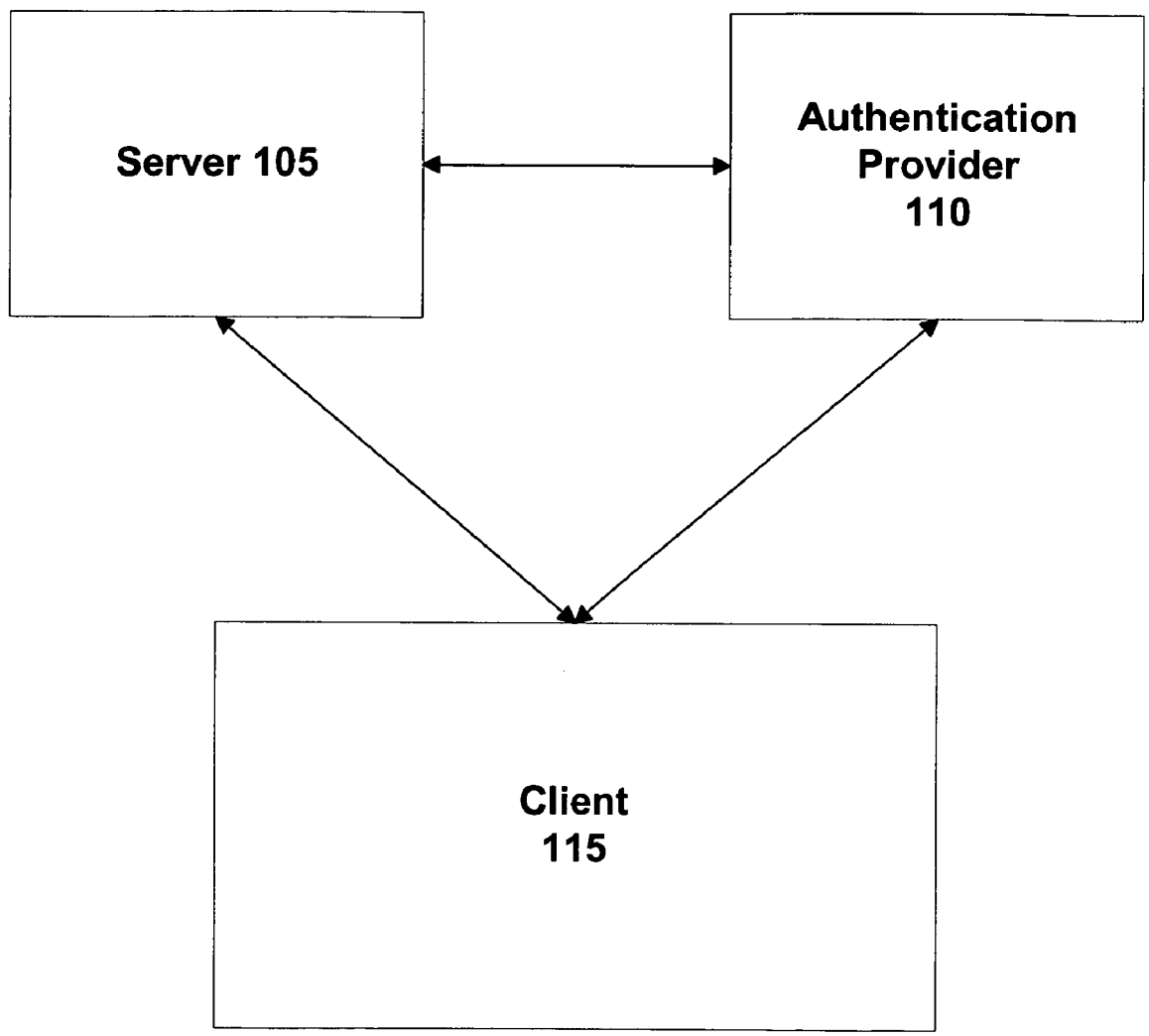
FIG. 1 illustrates an embodiment of an interaction between a client, a server, and an authentication provider.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

In accordance with embodiments, one or more authentication filters may be employed to supplement an authentication process. As used herein, the term "authentication filter" denotes constructs for modifying requests to access services or session states or other information associated with requests. The authentication process to be supplemented may be executed by one or more servlets in a servlet container. As used herein, the term "servlet" is used to denote module(s) of code that run in a server application to answer client requests and the term "servlet container" is used to denote one or more processes that manage servlets. A servlet authentication filter is an authentication filter that may be invoked by a servlet. Requests may be made by requestors (also called "users"), which include humans as well as computational entities. The ability to modify a request and/or request state can enable multi-phase authentication processes, i.e., authentication processes with more than one authentication step, or modification to a default authentication process, i.e., authentication processes invoked if no other authentication processes are provided.

In an embodiment, a method for authenticating a request to access a resource is provided. The method includes receiving at a servlet the request to access the resource. At least one of the request, a state of the request and information accompanying the request can be modified by application of at least one filter to the request to form a modified request. A determination is made whether the modified request requires authentication. The modified request is permitted if the modified request does not require authentication. If the modified request still requires authentication, at least one authentication process may be applied to the modified request.

In various embodiments, applying at least one authentication process can include one or more of: applying an additional filter to the modified request, invoking another authentication mechanism, or contacting an authentication provider, to authenticate the request. The authentication provider may be external to the servlet container. If the authentication processes applied to the request indicates that authentication has been performed successfully, then in one embodiment authorization process(es) to access to the resource may be permitted. The capability to use servlet filters to supplement authentication processing can enable specific embodiments to achieve one or more of: extensibility to the servlet authentication process; extensibility to the authentication process of an application server; extensibility to a mechanism of serving Web pages; extensibility to the mechanism of handling requests in an application server; modification of the request being passed to the servlet authentication process; and/or modification of the request being passed to the application server authentication process.

FIG. 1 illustrates one embodiment of an interaction between a client, a server, and an authentication provider. The server 105 is a system providing access to internal database resources and server-located applications to one or more clients 115. The server can provide access to one or more servlets. While the present invention is described with reference to an embodiment in which servlets that are executable programs written in the Java™ programming language and usually (though not always) executed in response to an invocation from an HTML page, the present invention is not limited to the Java™ programming language and may be practiced using other programming languages, i.e., JSP and the like without departing from the scope of the embodiments claimed. (Java™ is a trademark of Sun Microsystems, Inc.) In one embodiment, the server 105 utilizes an application server product, such as WebLogic® Server by BEA systems of San Jose, Calif.

In one embodiment, one or more clients 115 interact with the server through a conventional TCP/IP network interface. Other types of interfaces and protocols may be utilized in other embodiments. The clients can be remote to the server and utilize the server to access resources and data to which the server provides access.

The authentication provider 110 is a system that provides authentication services for other parties. The authentication provider can maintain some manner of identification information that is used to verify the existence of a party such as a user of the client 115. The authentication provider receives identification information from a user of the client. If the identification information matches stored identification information, the authentication provider can notify another party, such as an application running on the server 105 that the user has been successfully authenticated. In one embodiment, the authentication provider 110 utilizes Security Assertion Markup Language (SAML) to implement testing of security related assertions, i.e., conditional statements, in order to authenticate requests.

When a servlet running on the server is in various stages of an authentication process, a servlet authentication filter can be used to modify the request and/or the session state to engage in a multi-phase authentication process or to modify a default authentication process. Process flow of a filter embodiment is described in further detail below with reference to FIG. 4. In one embodiment and by way of illustration, it might be the case that when the servlet authentication filter(s) have completed processing, the filter(s)' processing has changed the session state such that the user is now logged in. Another case is that the user is not logged in but the submitted login data and/or login request is modified by the filter in order to fall within a format accepted by the authentication provider 110. For example, an authentication provider has two means of authenticating a user: standard authentication and secure authentication. Secure authentication is a more rigorous authentication process and gives the user access to more resources. The user can request secure authentication by adding the query parameter "secureAuthentication=true" to their request. A problem arises, however, that the owner of the Web site wishes to have the "secureAuthentication" string be case insensitive, something that the authentication provider does not support. Such a problem could be addressed by a servlet authentication filter that converts requests of the form:

http://myServer.com/
        myPage.html?secureauthentication=true
    to:
    http://myServer.com/
        myPage.html?secureAuthentication=true Then, the converted request may be passed to the authentication provider 110 for authentication.

If application of the authentication filter does not change the state of the user to "authenticated", an authentication provider 110 may be invoked to attempt to authenticate the user and return a response indicating whether the user has been authenticated. In some embodiments, there may be multiple authentication providers. In some embodiments, there may be multiple authentication filters. In one embodiment, if the authentication filter indicates that the user has been successfully authenticated then the conventional authorization mechanisms may proceed.

Figure 2:
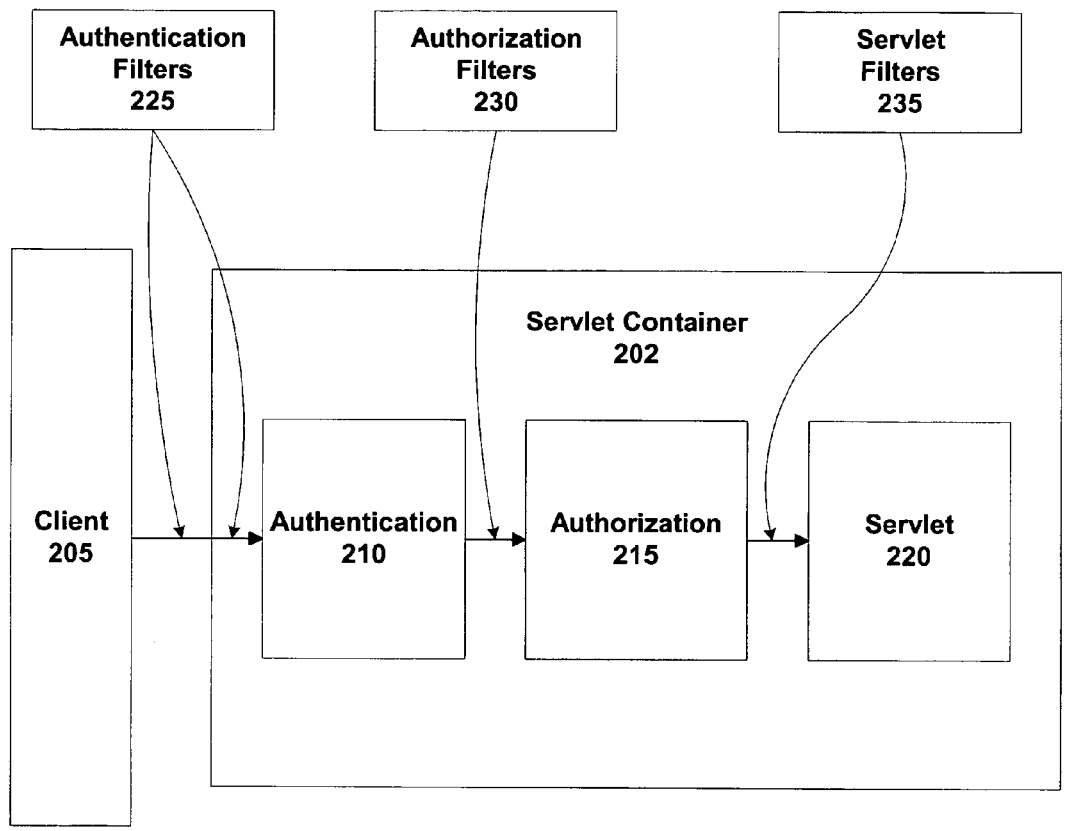
FIG. 2 illustrates an embodiment of a servlet authentication and authorization process for a servlet container.

FIG. 2 illustrates one embodiment of a servlet authentication and authorization process for a servlet container. A client 205 is utilized to access a servlet 220 within a servlet container 202. The client 205 is preferably part of the previously illustrated client 115 and the servlet container 202 is preferably part of the server 105. The servlet container provides network access for the servlet and controls access to protected resources. When a party attempts to access a protected resource, the servlet container initializes an authentication process 210 and an authorization process 215. The authentication process 210 is configured to verify the identity of a party seeking a resource and may request a username, password, or some other proof of identity. The authorization process 215 is configured to determine whether a particular party is permitted to access a resource. The authorization process 215 preferably checks a set of authorizations associated with parties and compares it to the party produced by the authentication process 210. If the set of authorizations indicates that the party is permitted to access the resource, the resource is served.

An authentication filter 225 provides the ability to modify login data and or state prior to execution of an authentication process by authentication process 210, thereby providing enhanced extensibility to embodiments. In one embodiment, filter 225 can be set on a per-application basis or a per-realm basis. Filters set on a per-application basis can be configured within a deployment descriptor of the application and appear to outside parties as part of the application. Filters set on a per-realm basis can be configured within the servlet container and appear to outside parties as part of the servlet container 205. Filters can intercept the resource serving process at various steps, might modify the request and/or request state or other information accompanying the request, and might permit the resource serving process to go forward if the request state was modified to "logged in." Filters may be used in conjunction with authentication providers 110 and/or other authentication processes to authenticate the request.

In some embodiments, in addition to the authentication filter 225 used to assist in authentication, one or more of an authorization filter 230 and a servlet filter 235 may be used to assist in authorization and serving the resource, respectively. In one such embodiment, the authorization filter 230 would be run before the authorization process 215, while the servlet filter 235 would be run before the serving the resource by servlet 220. The authentication filter 225 authenticates a party before the authentication process 210 of the servlet container 202 verifies the party's identity. The authorization filter 230 authenticates a party after the authentication process 210, but before the authorization process 215. The servlet filter 235 utilizes an authentication provider after the authorization process 215, but before the resource is served. The presence of more than one filter, however, is not required by embodiments of the present invention.

In one embodiment, the code for interacting with a servlet through a Java™ programming interface is disclosed below:

package weblogic.security.spi;

```
/**
 * An AuthenticationProvider implements this mixin to signal that they
 * have AuthenticationFilters they wish to be included by the Servlet
 * container during the authentication process.
 *
public interface ServletAuthenticationFilter {
    /**
     * This method will return an ordered list of javax.servlet.Filters that
     * will be executed during the authentication process of the Servlet
     * container. It should return equivalent lists every time it is called.
     * That is, the number of times it is called or the timing of the calls
     * should not affect its return value.
     *
     * @return the list of Servlet authentication filters to use
     */
    public Filter[ ] getServletAuthenticationFilters( );
}
```

```
class PrincipalAuthenticator {
    ...
    /**
     * This method will return an ordered list of javax.servlet.Filters that
     * will be executed during the authentication process of the Servlet
     * container. It should return equivalent lists every time it is called.
     * That is, the number of times it is called or the timing of the calls
     * should not affect its return value.
     *
     * @return the list of Servlet authentication filters to use
     */
    public Filter[ ] getServletAuthenticationFilters( );
```

One embodiment of configuration parameters for a filter could be presented in XML. The XML below illustrates one such possible XML configuration:

```
<?xml version="1.0" ?>
<!DOCTYPE MBeanType SYSTEM "commo.dtd">
<MBeanType
Name          = "ServletAuthenticationFilter"
Package       = "weblogic.management.security.authentication"
Extends       = "weblogic.management.security.authentication.
                AuthenticationProvider"
PersistPolicy = "OnUpdate"
Abstract      = "true"
Description   = "The SSPI MBean that all Servlet Authentication
  Filter providers must extend. This MBean is just a marker
  interface. It has no methods on it."
>
</MBeanType>
```

Figure 3:
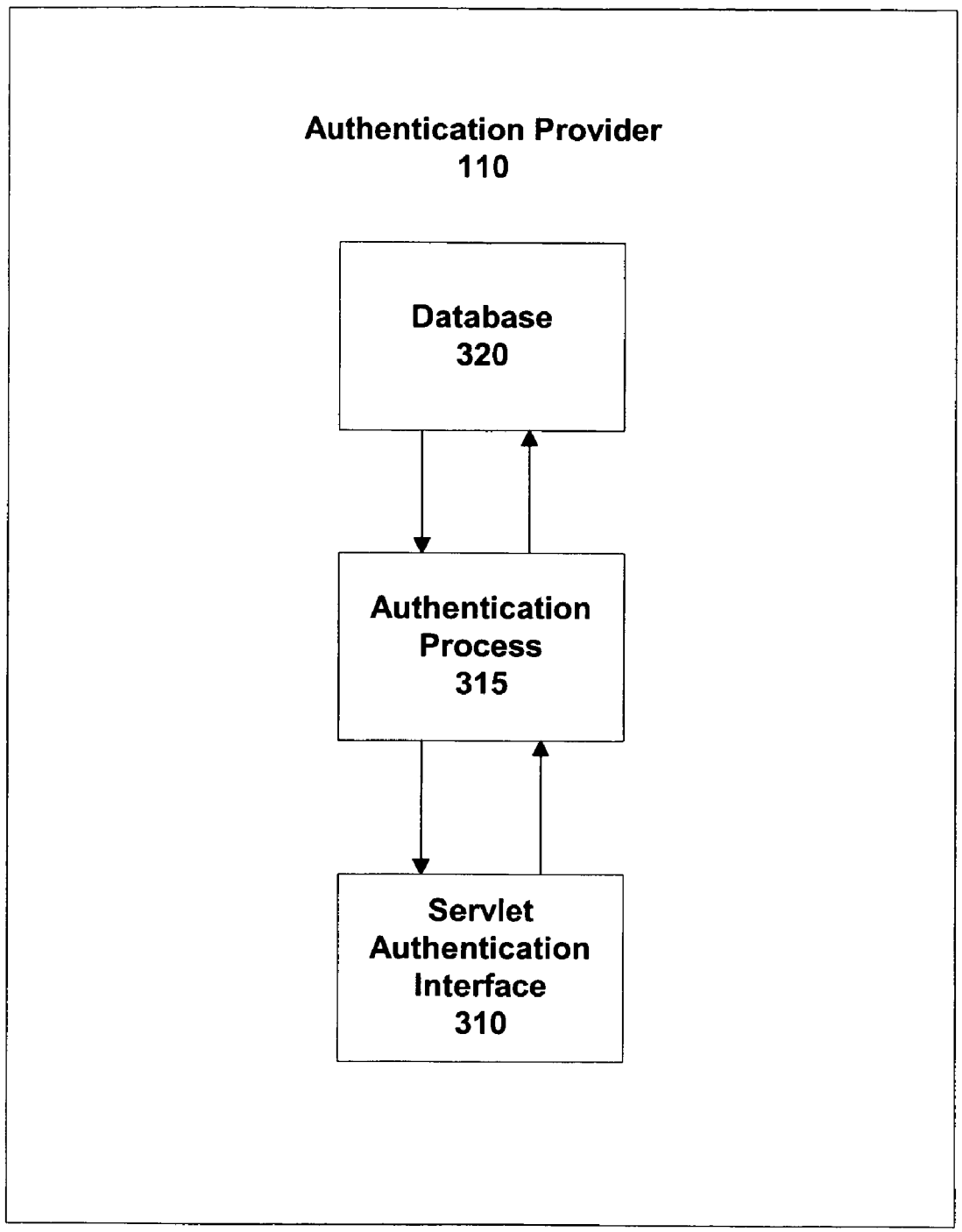
FIG. 3 illustrates an overview of an authentication provider in accordance with an embodiment.

FIG. 3 illustrates an overview of an example authentication provider 110. The authentication provider 110 includes a servlet authentication interface 310, an authentication process 315, and a database 320. The authentication interface 310 allows the authentication provider to interface with the server 105. The authentication interface is configured to return one or more classes to the server if the authentication succeeds.

The authentication process 315 is used by the authentication provider 110 to verify the identity of a party. In one embodiment, the authentication process 315 is used for other, non-servlet based authentications, that are requested through the authentication provider 110 directly, or other parties utilizing the authentication provider. The database 320 stores identification information utilized by the authentication process 315 to verify the identity of a party. The database 320 can store username information, passwords, biometric data, or any other information that can be used to verify the identity of a party. In one embodiment, the database 320 is a Structured Query Language (SQL) database.

Figure 4:
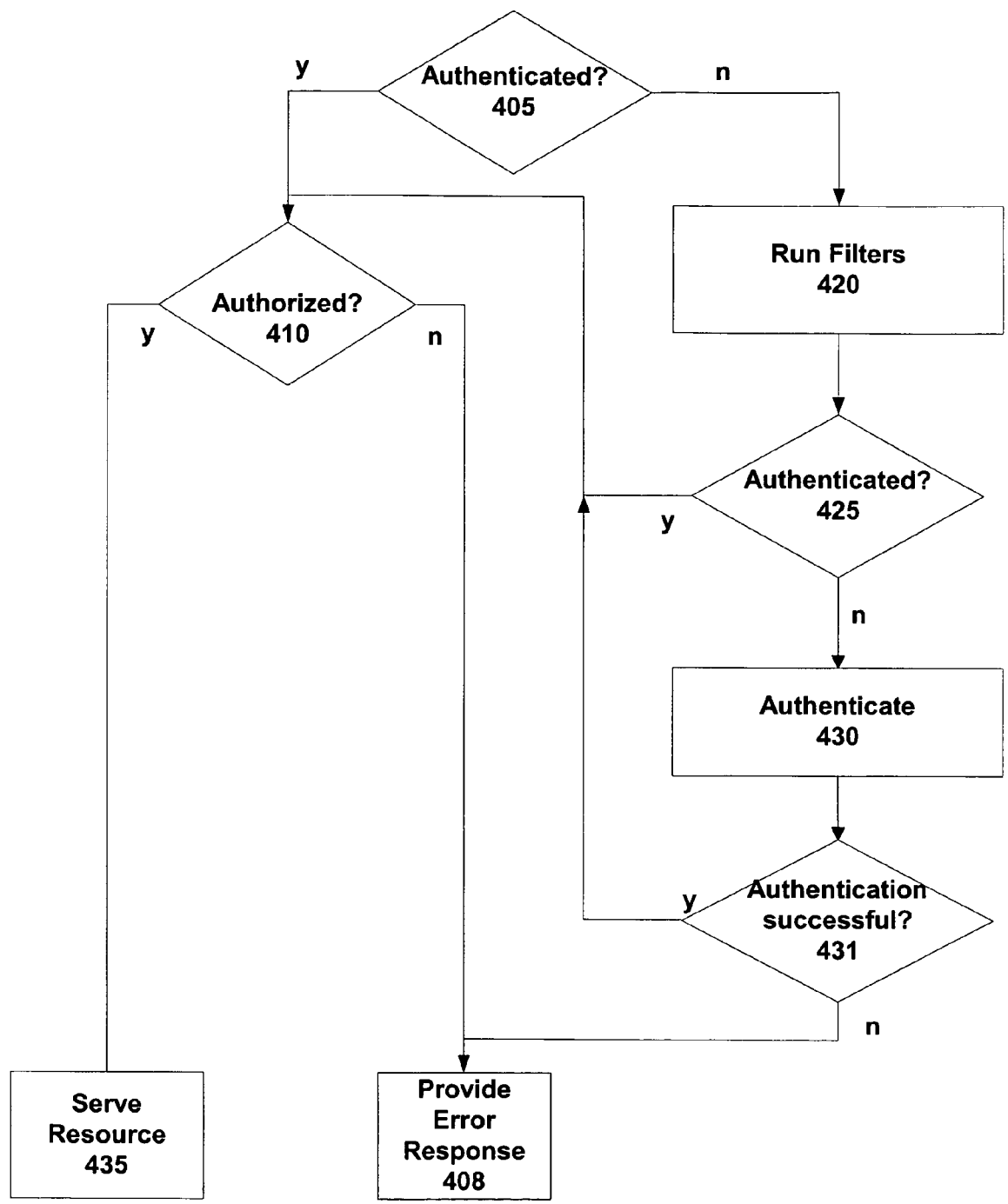
FIG. 4 is a flow chart illustrating an overview of an authentication process performed by a servlet container in accordance with one embodiment.

FIG. 4 is a flow chart illustrating one embodiment of an overview of an authentication process performed by a servlet container. In step 405, the servlet container determines if the current request to access a resource is from an authenticated source. In one embodiment, step 405 may be performed by execution of a default or other authentication mechanism at the servlet container. If the request has been authenticated, the process skips to step 410 and the container determines if the request is authorized.

Otherwise, if step 405 determines that the request has not been authenticated, one or more authentication filters are fetched and run in step 420. In one embodiment, filters are chained on one or more FilterChain(s), which can be fetched from a filter chain pool. A FilterChain is a list of filters to be utilized in successive order. The individual filters use the FilterChain to access the next filter in the list, or for the last filter, to provide the resource. In one embodiment, the filters are run in successive order. If each filter returns a class indicating a successful authentication, the next filter is invoked. Execution of the filters may modify the request to access the resource, the session state or other information associated with the request. By modifying the session state, it is possible for the requestor associated with the request to be logged in by operation of the filters.

In step 425, the servlet container determines whether an authentication will be performed. The test of step 425 is conducted because the filters, by modifying the session, may have logged in the requestor associated with the request in step 420. If the requestor were not logged in, however, the servlet container could decide to perform an authentication. If the servlet container determines that the requestor has been authenticated, then no authentication need be performed, and processing moves to step 410 for authorization determination. Otherwise, in step 430, the server container performs an authentication procedure on the request and session that have previously had filters applied. In step 431, the container determines whether the result of the authentication step 430 is successful. In one embodiment, step 430 is successful if each authentication provider has returned a class indicating a successful authentication for the request. If the container determines that authentication processing of step 430 failed, then the process moves to step 408 and an error condition is raised.

If the source of the request has been authenticated, the process continues with step 410 and the container determines if the requestor associated with the request is authorized to access the requested resource. If the requestor associated with the request is authorized, then in step 435, the resource is served. Otherwise, in step 408, an error response is provided.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

What is claimed:

1. A method for authenticating a request to access a resource, the method comprising:
    receiving at a servlet the request to access the resource;
    modifying at least one of the request, a state of the request and information accompanying the request by invoking one or more authentication filters to the request to form a modified request, wherein the invocation of the one or more authentication filters causes an authentication state of a source of the request to be modified such that said source is changed from an unauthenticated status to an authenticated status as a result of the invocation of the one or more authentication filters;
    determining whether the modified request still requires additional authentication;
    permitting the modified request to be processed if the modified request does not require additional authentication;
    applying at least one authentication process to the modified request if the modified request still requires additional authentication; and
    providing access to a protected resource in response to receiving authentication information.

2. The method of claim 1, wherein at least one authentication filter of the one or more authentication filters contacts an authentication provider.

3. The method of claim 2, further comprising denying access to the protected resource in response to a failed authentication from the authentication provider.

4. The method of claim 1, wherein applying at least one authentication process comprises applying at least one filter to the modified request.

5. The method of claim 1, wherein applying at least one authentication process comprises invoking another authentication process.

6. The method of claim 1, wherein permitting the modified request to be processed if the modified request no longer requires authentication comprises:
    providing access to the protected resource in response to receiving authentication from the external authentication provider.

7. The method of claim 1, wherein the authentication process of an application server is thereby enabled to be extended by modification of the one or more authentication filters.

8. The method of claim 1, wherein the at one or more authentication filters are chained, thereby enabling processing of a successive filter to be dependent upon results of processing a previous filter.

9. The method of claim 1, further comprising applying a filter prior to authorizing the request.

10. The method of claim 1, further comprising applying a filter prior to serving the resource.

11. A machine readable storage medium having instructions stored thereon that when executed by a processor cause a system to:
    receive at a servlet the request to access the resource;
    modify at least one of the request, a state of the request and information accompanying the request by invoking one or more authentication filters to the request to form a modified request, wherein at least one authentication filter of the one or more authentication filters contacts an authentication provider, wherein the invocation of the one or more authentication filters causes an authentication state of a source of the request to be modified such that said source is changed from an unauthenticated status to an authenticated status as a result of the invocation of the one or more authentication filters;
    determine whether the modified request still requires additional authentication;
    permit the modified request to be processed if the modified request does not require additional authentication;
    apply at least one authentication process to the modified request if the modified request still requires additional authentication; and
    provide access to a protected resource in response to receiving authentication information.

12. The machine readable storage medium of claim 11, wherein instructions for applying at least one authentication process comprises instructions for contacting authentication provider.

13. The machine readable storage medium of claim 12, further comprising instructions that when executed by a processor cause the processor to deny access to a resource in response to a failed authentication from the authentication provider.

14. The machine readable storage medium of claim 11, wherein instructions for applying at least one authentication process comprises instructions for applying at least one filter to the modified request.

15. The machine readable storage medium of claim 11, wherein instructions for applying at least one authentication process comprises instructions for invoking another authentication process.

16. The machine readable storage medium of claim 11, wherein the instructions for permitting the modified request to be processed if the modified request no longer requires authentication comprise instructions for providing access to the protected resource in response to receiving authentication from the authentication provider.

17. The machine readable storage medium of claim 11, wherein the authentication process of an application server is thereby enabled to be extended by modification of the at least one filter.

18. The machine readable storage medium of claim 11, wherein the one or more filters are chained, thereby enabling processing of a successive filter to be dependent upon results of processing a previous filter.

19. The machine readable storage medium of claim 11, further comprising instructions that when executed by a processor cause the processor to apply a filter prior to authorizing the request.

20. The machine readable storage medium of claim 11, further comprising instructions that when executed by a processor cause the processor to apply a filter prior to serving the resource.

21. The method of claim 1, wherein authentication is performed by at least one authentication filter before authentication is performed by an authentication process provided by a servlet container.

22. The method of claim 1, wherein the one or more authentication filters further comprise:
  at least one filter set on a per-application basis that is configured within a deployment descriptor of an application and appears to entities outside of the servlet container as part of said application; and
  at least one filter set on a per-realm basis that is configured within the servlet container and appears to the entities outside of the servlet container as part of said servlet container.

23. The method of claim 1, further comprising:
  invoking one or more authorization filters after the authentication process is finished but before an authorization process is invoked; and
  invoking one or more servlet filters after the one or more authorization filters have finished but before the protected resource is accessed.

24. The method of claim 1, wherein the invocation of the one or more authentication filters modifies a session associated with the source of the request and logs in the source of the request.

25. A method for authenticating requests to access resources in an application server environment, said method comprising:
  extending a default authentication process of a servlet container by providing a set of external authentication filters to the default authentication process, wherein said external authentication filters are supplemental to the default authentication process of the servlet container;
  receiving a request to access a resource;
  invoking the default authentication process of the servlet container;
  determining whether the request has been authenticated;
  if the request has not been authenticated, invoking a chain of said external authentication filters, wherein each of said external authentication filters uses the chain in order to access a next external authentication filter in the set, and wherein execution of the chain of said external authentication filters causes a state of the request to be modified, such that as a result of the state being modified, the request can be authenticated by the servlet container; and
  providing access to the resource by the servlet container if the request has been authenticated.

26. The method of claim 25, wherein the chain of said external authentication filters is fetched from a filter chain pool, and wherein the chain includes a list of two or more external authentication filters to be utilized in successive order.

27. The method of claim 25, wherein once the servlet container determines that the request has been authenticated, the servlet container determines whether the request is authorized prior to providing access to said resource.

* * * * *

UNITED STATES PATENT AND TRADEMARK OFFICE
CERTIFICATE OF CORRECTION

| | |
|---|---|
| PATENT NO. | : 7,610,613 B2 |
| APPLICATION NO. | : 11/123389 |
| DATED | : October 27, 2009 |
| INVENTOR(S) | : Vinod Mehra et al. |

Page 1 of 1

It is certified that error appears in the above-identified patent and that said Letters Patent is hereby corrected as shown below:

In column 8, line 19, in claim 8, after "the" delete "at".

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,610,613 B2  Page 1 of 1
APPLICATION NO. : 11/123389
DATED : October 27, 2009
INVENTOR(S) : Mehra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1089 days.

Signed and Sealed this

Twelfth Day of October, 2010

David J. Kappos
*Director of the United States Patent and Trademark Office*